(12) United States Patent
Yang

(10) Patent No.: US 11,867,941 B2
(45) Date of Patent: Jan. 9, 2024

(54) LIGHT GUIDE ASSEMBLY

(71) Applicant: CYNTEC CO., LTD., Hsinchu (TW)

(72) Inventor: Chi-Jui Yang, Hsinchu (TW)

(73) Assignee: CYNTEC CO., LTD., Hsinchu (TW)

(*) Notice: Subject to any disclaimer, the term of this patent is extended or adjusted under 35 U.S.C. 154(b) by 0 days.

(21) Appl. No.: 18/143,089

(22) Filed: May 4, 2023

(65) Prior Publication Data

US 2023/0358945 A1 Nov. 9, 2023

Related U.S. Application Data

(60) Provisional application No. 63/338,444, filed on May 4, 2022.

(51) Int. Cl.
*F21V 8/00* (2006.01)
*H01R 13/717* (2006.01)

(52) U.S. Cl.
CPC ......... *G02B 6/0073* (2013.01); *G02B 6/0015* (2013.01); *H01R 13/7175* (2013.01)

(58) Field of Classification Search
CPC . G02B 6/0073; G02B 6/0015; H01R 13/7175
See application file for complete search history.

(56) References Cited

U.S. PATENT DOCUMENTS

2015/0131317 A1* 5/2015 Yuki .................... G02B 6/0073
362/610

\* cited by examiner

*Primary Examiner* — Mary Ellen Bowman
(74) *Attorney, Agent, or Firm* — Min-Lee Teng

(57) ABSTRACT

A light guide assembly, comprising: a substrate and a light guide disposed on the substrate, wherein the top surface of the body comprises a first protrusion having a first slanting surface and a second slanting surface opposite to the first slanting surface for reflecting lights entering into the body, wherein a first outer surface of the body extends from a first lateral surface to the first slanting surface, wherein a highest point of the first slanting surface is located between the first lateral surface and a second lateral surface opposite to the first lateral surface, and a highest point of the second slanting surface is located between the first lateral surface and a lowest point of the second slanting surface.

20 Claims, 11 Drawing Sheets

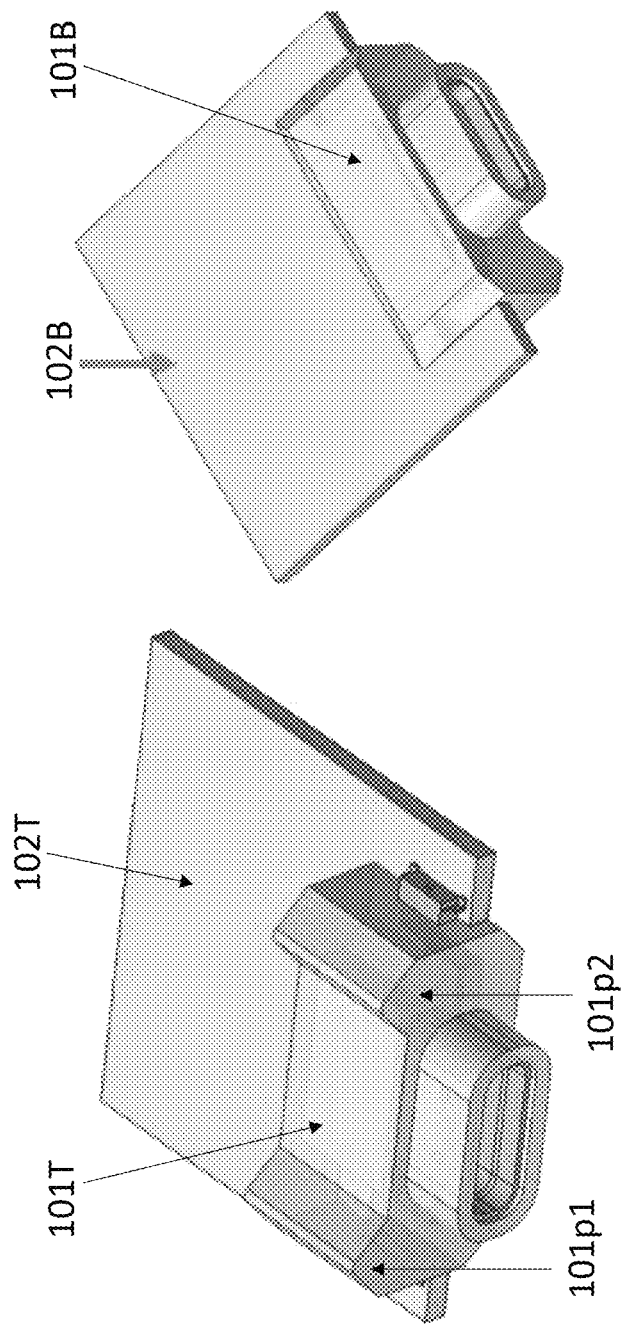

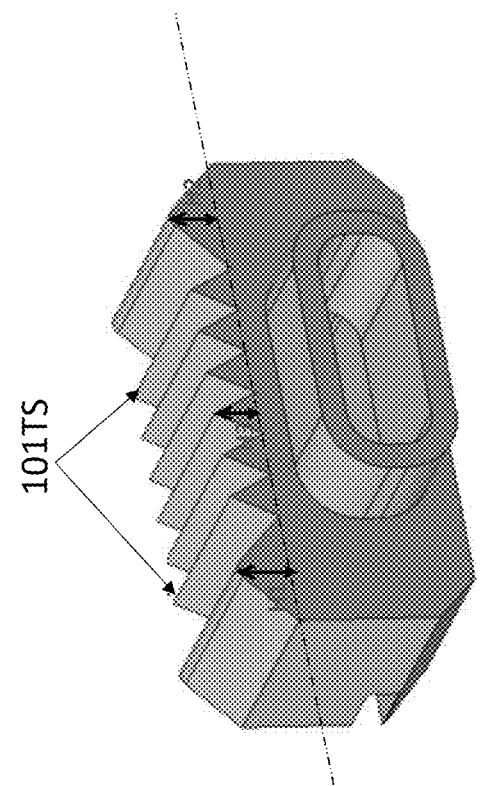
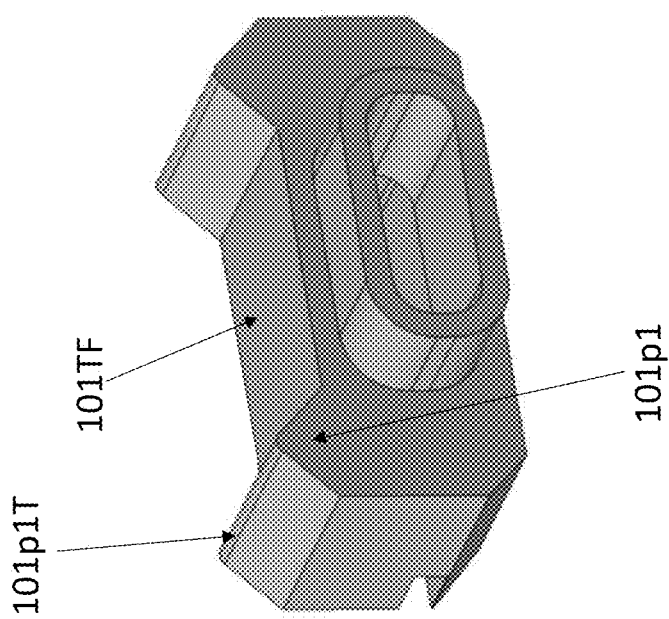
FIG. 3B
FIG. 3A

LIGHT GUIDE ASSEMBLY

CROSS-REFERENCES TO RELATED APPLICATIONS

This application claims the benefit of U.S. Provisional Patent Application No. 63/338,444, filed on May 4, 2022, which is hereby incorporated by reference herein and made a part of the specification.

BACKGROUND OF THE INVENTION

I. Field of the Invention

The present invention relates to a light guide assembly, and in particular, to a light guide assembly used in vehicles.

II. Description of Related Art

Portable devices become more and more popular, however, portable devices need to be charged from time to time, especially for vehicle users. Furthermore, it is necessary to have a lighting functionality on the charging device used in vehicles to light up the plug-in hole and its surrounding areas. However, conventional charging devices with lighting functionality are not ideal in terms of light source uniformity. In order to meet the requirement of uniform brightness, conventional charging devices use more LED to light up the plug-in hole and its surrounding areas, which will increase the cost of the charging devices.

Therefore, a better solution is needed to resolve the above-mentioned issues.

SUMMARY OF THE INVENTION

One objective of the present invention is to provide a light guide assembly to achieve a better performance in uniform brightness at a lower cost.

In one embodiment of the present invention, a light guide assembly is disclosed, wherein the light guide assembly comprises: A light guide assembly, comprising: a substrate; a light guide, disposed on the substrate, wherein the light guide comprises a body having a top surface, a first lateral surface, and a second lateral surface opposite to the first lateral surface of the body, wherein the top surface of the body comprises a first protrusion having a first slanting surface and a second slanting surface opposite to the first slanting surface for reflecting lights entering into the body, wherein a first outer surface of the body extends from the first lateral surface to the first slanting surface, wherein a highest point of the first slanting surface is located between the first lateral surface and the second lateral surface, and a highest point of the second slanting surface is located between the first lateral surface and a lowest point of the second slanting surface.

In one embodiment, the top surface of the body further comprises a second protrusion having a third slanting surface and a fourth slanting surface opposite to the third slanting surface for reflecting lights entering into the body, wherein a second outer surface of the body extends from the second lateral surface to the fourth slanting surface, wherein a highest point of the fourth slanting surface is located between the first lateral surface and the second lateral surface, and a highest point of the third slanting surface is located between the second lateral surface and a lowest point of the third slanting surface.

In one embodiment, the body of the light guide comprises a top portion located above the substrate and a bottom portion located below the substrate, wherein the light guide forms a hollow space located below the top portion and above the bottom portion of the light guide, wherein a third outer surface of the body extends from the first lateral surface to the bottom surface of the body via a fifth slanting surface, wherein a lowest point of the fifth slanting surface is located between the first lateral surface and the second lateral surface, wherein the body comprises a sixth slanting surface adjacent to the hollow space, wherein a lowest point of the sixth slanting surface is located between the first lateral surface and a highest point of the sixth slanting surface, wherein a first light enters into the body through the first lateral surface, wherein the first light is directed to the bottom part of the light guide by sequentially reflecting the first light by the sixth slanting surface, the second slanting surface, the first slanting surface and the fifth slanting surface.

In one embodiment, a third outer surface of the body extends from the first lateral surface to the bottom surface of the body via a fifth slanting surface, wherein a lowest point of the fifth slanting surface is located between the first lateral surface and the second lateral surface.

In one embodiment, a third outer surface of the body extends from the first lateral surface to the bottom surface of the body via a fifth slanting surface, wherein a lowest point of the fifth slanting surface is located between the first lateral surface and the second lateral surface.

In one embodiment, a first LED is disposed on the substrate outside the body, wherein the first LED is located at a lateral side of the first lateral surface for emitting a first light into the body via the first lateral surface.

In one embodiment, the first LED is a first vertical LED, wherein the first vertical LED emits the first light to the first lateral surface in a horizontal direction.

In one embodiment, a first LED is disposed on the substrate outside the body, wherein the first LED is located at a lateral side of the first lateral surface for emitting a first light into the body via the first lateral surface; and wherein a second LED is disposed on the substrate outside the body, wherein the second LED is located at a lateral side of the second lateral surface for emitting a second light into the body via the second lateral surface.

In one embodiment, a fourth outer surface of the body extends from the second lateral surface to the bottom surface of the body via a seventh slanting surface, wherein a lowest point of the seventh slanting surface is located between the first lateral surface and the second lateral surface, wherein the body comprises an eighth slanting surface adjacent to the hollow space, wherein a lowest point of the eighth slanting surface is located between the second lateral surface and a highest point of the eighth slanting surface, wherein a second light enters into the body through the second lateral surface, wherein the second light is directed to the bottom part of the light guide by sequentially reflecting the second light by the eighth slanting surface, the third slanting surface, the fourth slanting surface and the seventh slanting surface.

In one embodiment, the top surface of the body comprises a first portion having a shape of a sawtooth swing up and down, wherein said first portion is located between the first protrusion and the second protrusion, and a first height of said first portion is less than a second height of the first protrusion and a third height of the second protrusion, respectively.

In one embodiment, the first LED is a first vertical LED, wherein the first vertical LED emits the first light to the first lateral surface in a horizontal direction; and the second LED is a second vertical LED, wherein the second vertical LED emits the second light to the second lateral surface in a horizontal direction.

In one embodiment, the body comprises a front portion having a ring shape, wherein a connector is disposed inside a hollow space of the body with a portion of the connector being enclosed by the front portion.

In one embodiment, the connector is a USB connector.

In one embodiment, the connector is a USB Type C connector.

In one embodiment, the body of the light guide comprises a transparent resin.

In one embodiment, the body of the light guide comprises a diffusion powder disposed in the transparent resin, wherein the diffusion powder comprises an organic material.

In one embodiment, the transparent resin comprises polycarbonate.

The light guide assembly according to claim 11, wherein the penetration spectrum of the body is 550~610 nm, wherein the wavelength of the first vertical LED is 570 nm.

In one embodiment, the top surface of the first protrusion comprises a flat surface between the first slanting surface and the second slanting surface.

In one embodiment, a first recess is formed on a first lateral surface of the substrate, wherein a first portion of the body is disposed in the first recess.

In one embodiment, a second recess is formed on the first lateral surface of the substrate, wherein a second portion of the body is disposed in the second recess.

In one embodiment, a third recess is formed on the first lateral surface of the substrate, wherein a portion of the connector is disposed in the third recess.

In one embodiment, the substrate is a PCB.

In one embodiment, a second outer surface of the body extends from the first lateral surface to the bottom surface of the body via a third slanting surface, wherein a lowest point of the third slanting surface is located between the first lateral surface and the second lateral surface.

In order to make the aforementioned and other features and advantages of the present invention more comprehensible, several embodiments accompanied by figures are described in detail below.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

FIG. 2A depicts a perspective view of a light guide assembly according to one embodiment of the present invention;

FIG. 2B depicts a perspective view of a light guide assembly according to one embodiment of the present invention;

FIG. 3A depicts a perspective view of a light guide according to one embodiment of the present invention;

FIG. 3B depicts a perspective view of a light guide according to one embodiment of the present invention;

DESCRIPTION OF EMBODIMENTS

Figure 1A:
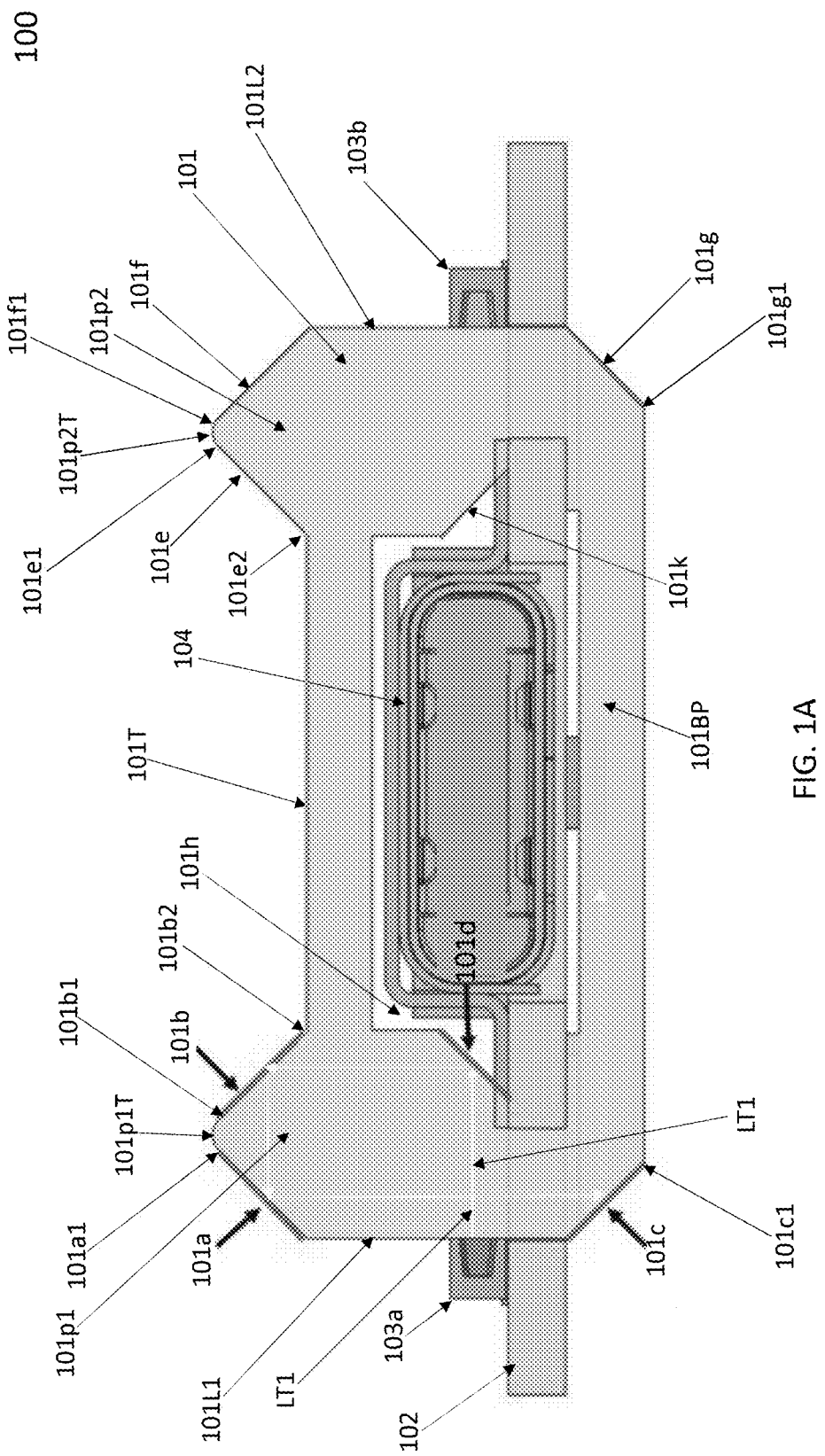
FIG. 1A depicts a top view of a light guide assembly according to one embodiment of the present invention.
Figure 1B:
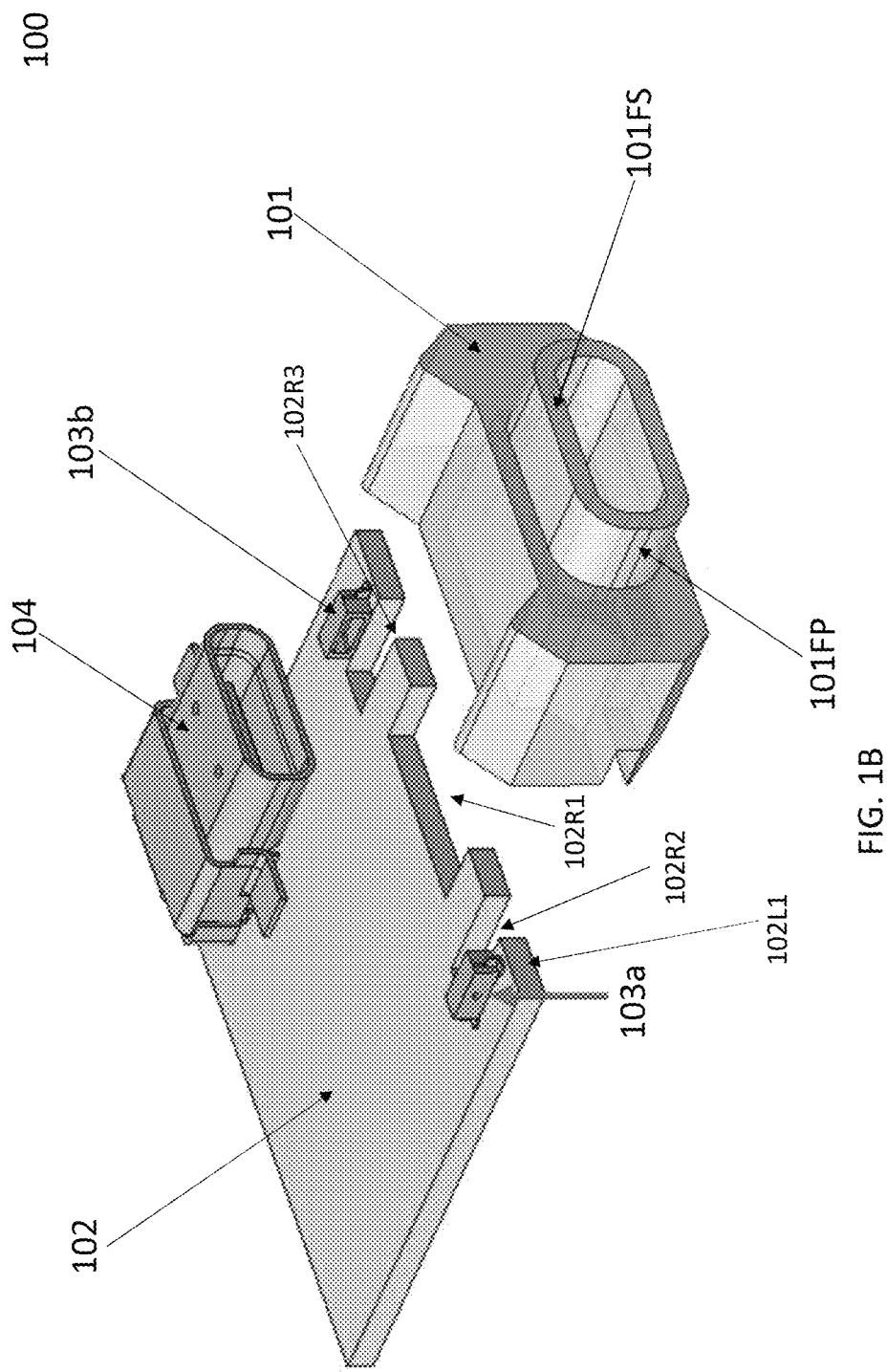
FIG. 1B depicts an exploded view of a light guide assembly according to one embodiment of the present invention.
Figure 1C:
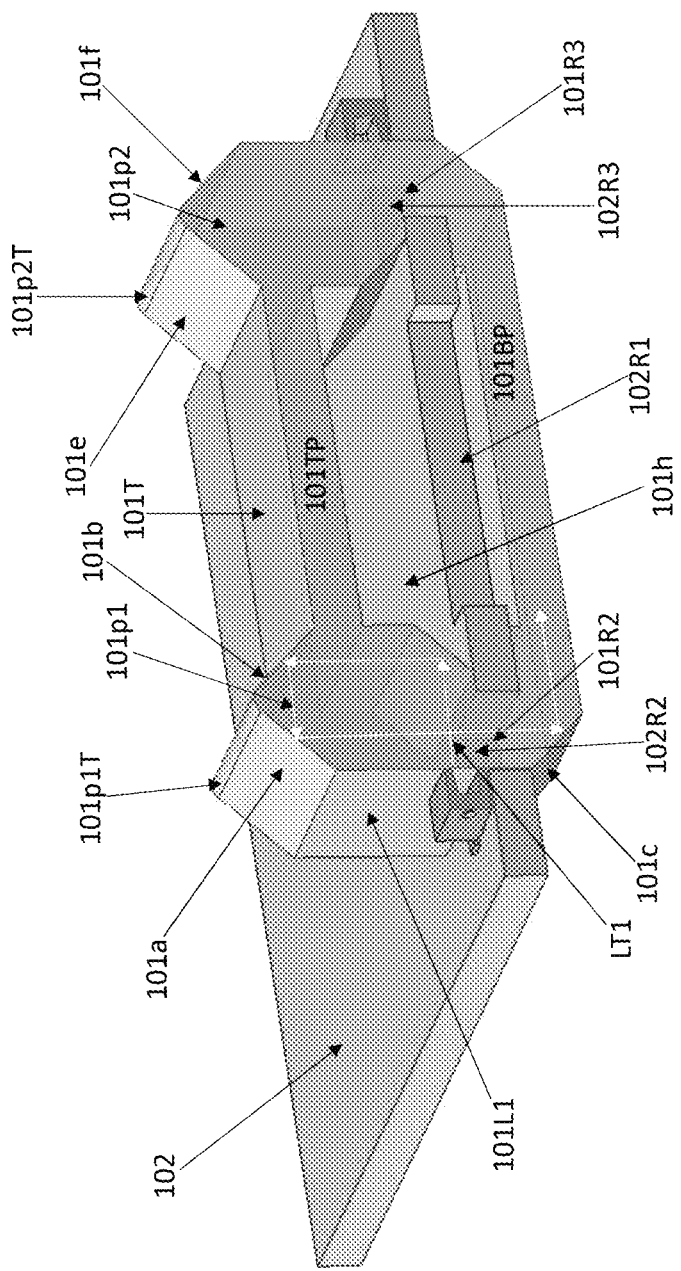
FIG. 1C depicts a perspective view of a light guide assembly according to one embodiment of the present invention.

FIG. 1A depicts a top view of a light guide assembly 100 according to one embodiment of the present invention; FIG. 1B depicts an exploded view of a light guide assembly 100 according to one embodiment of the present invention; and FIG. 1C depicts a perspective view of a light guide assembly 100 according to one embodiment of the present invention. Please refer to FIG. 1A, FIG. 1B and FIG. 1C together. wherein the light guide assembly 100 comprises: a substrate; a light guide, disposed on the substrate 102, wherein the light guide comprises a body 101 having a top surface 101T, a first lateral surface 101L1, and a second lateral surface 101L2 opposite to the first lateral surface 101L1 of the body 101 of the light guide, wherein the top surface 101T of the body 101 comprises a first protrusion 101p1 having a first slanting surface 101a and a second slanting surface 101b opposite to the first slanting surface 101a for reflecting lights entering into the body 101 of the light guide, wherein a first outer surface of the body extends from the first lateral surface 101L1 to the first slanting surface 101a, wherein a highest point 101a1 of the first slanting surface 101a is located between the first lateral surface 101L1 and the second lateral surface 101L2 of the body 101, and a highest point 101b1 of the second slanting surface 101b is located between the first lateral surface 101L1 and a lowest point 101b2 of the second slanting surface 101L2.

In one embodiment, the top surface 101T of the body 101 further comprises a second protrusion 101p2 having a third slanting surface 101e and a fourth slanting surface 101f opposite to the third slanting surface 101e for reflecting lights, wherein a second outer surface of the body 101 extends from the second lateral surface 101L2 to the fourth slanting surface 101f, wherein a highest point 101f1 of the fourth slanting surface 101f is located between the first lateral surface 101L1 and the second lateral surface 101L2 of the body 101 of the light guide, and a highest point 101$e1$ of the third slanting surface 101$e$ is located between the second lateral surface 101L2 and a lowest point 101$e2$ of the third slanting surface 101$e$.

In one embodiment, a third outer surface of the body extends from the first lateral surface 101L1 to the bottom surface 101B of the body 101 via a fifth slanting surface 101$c$, wherein a lowest point 101$c1$ of the fifth slanting surface 101$c$ is located between the first lateral surface 101L1 and the second lateral surface 101L2.

In one embodiment, as shown in FIG. 1A, the light guide comprises a top portion 101TP located above the substrate 102 and a bottom portion 101BP located below the substrate 102, wherein the light guide forms a hollow space 101$h$ located below the top portion 101TP and above the bottom portion 101BP of the body 101 of the light guide, wherein the body 101 comprises a sixth slanting surface adjacent to the hollow space 101$h$, wherein a lowest point of the sixth slanting surface 101$d$ is located between the first lateral surface 101L1 and a highest point of the sixth slanting surface 101$d$, wherein a first light LT1 enters into the body 101 through the first lateral surface 101L1, wherein the first light LT1 is directed to the bottom portion 101BP f the body 101 of the light guide by sequentially reflecting the first light LT1 by the sixth slanting surface 101$d$, the second slanting surface 101$b$, the first slanting surface 101$a$ and the fifth slanting surface 101$c$.

In one embodiment, a fourth outer surface of the body 101 extends from the second lateral surface 101L2 to the bottom surface 101B of the body 101 via a seventh slanting surface 101$g$, wherein a lowest point 101$g1$ of the seventh slanting surface 101$g$ is located between the first lateral surface 101L1 and the second lateral surface 101L2.

In one embodiment, the body of the light guide comprises an eighth slanting surface 101$k$ adjacent to the hollow space, wherein a lowest point of the eighth slanting surface 101$k$ is located between the second lateral surface and a highest point of the eighth slanting surface 101$k$, wherein a second light enters into the body through the second lateral surface, wherein the second light is directed to the bottom part of the light guide by sequentially reflecting the second light by the eighth slanting surface 101$k$, the third slanting surface 101$e$, the fourth slanting surface 101$f$, and the seventh slanting surface 101$g$.

In one embodiment, a light source, such as a first LED 103$a$, is disposed on the substrate outside the body, wherein the first LED 103$a$ is located at a lateral side of the first lateral surface 101L1 for emitting a first light LT1 into the body 101 via the first lateral surface 101L1, as shown in FIG. 1A.

In one embodiment, a light source, such as a second LED 103$b$, is disposed on the substrate outside the body, wherein the second LED 103$b$ is located at a lateral side of the second lateral surface 101L2 for emitting a second light into the body 101 via the second lateral surface 101L2.

In one embodiment, the first LED 103$a$ is a first vertical LED, wherein the first vertical LED 103$a$ emits the first light to the first lateral surface in a horizontal direction.

In one embodiment, the first LED 103$a$ is a first vertical LED, wherein the first vertical LED 103$a$ emits the first light to the first lateral surface in a horizontal direction; and wherein a second LED 103$b$ is disposed on the substrate outside the body, wherein the second LED 103$b$ is located at a lateral side of the second lateral surface 101L2 for emitting a second light into the body 101 via the second lateral surface 101L2.

In one embodiment, the first LED is a first vertical LED, wherein the first vertical LED emits the first light to the first lateral surface in a horizontal direction; and the second LED is a second vertical LED, wherein the second vertical LED emits the second light to the second lateral surface in a horizontal direction.

In one embodiment, as shown in FIG. 1B, the body 101 comprises a front portion 101FP having a ring shape, wherein a connector 104 is disposed inside a hollow space 101$h$ of the body 101 with a portion of the connector 104 being enclosed by the front portion 101FP.

In one embodiment, the top surface 101T of the body 101 comprises a flat surface 101TF that is located between the first protrusion 101$p1$ and the second protrusion 101$p2$.

In one embodiment, the connector 104 is a USB connector.

In one embodiment, the body 101 of the light guide comprises a transparent resin.

In one embodiment, the body 101 of the light guide comprises a diffusion powder disposed in the transparent resin, wherein the diffusion powder comprises an organic material.

In one embodiment, the transparent resin comprises polycarbonate.

In one embodiment, the penetration spectrum of the body 101 is 55~0610 nm, wherein the wavelength of the first vertical LED 103$a$ is 570 nm.

In one embodiment, as shown in FIG. 1B, a first recess 102R2 is formed on a first lateral surface 102L1 of the substrate 102, wherein a first portion 101R2 of the body 101 is disposed in the first recess 102R2, as shown in FIG. 1C. By doing so, the first light can be reflected to the bottom portion 101BP by passing through the first portion 101R2 disposed in the first recess 102R2

In one embodiment, as shown in FIG. 1B, a second recess 102R3 is formed on the first lateral surface 102L1 of the substrate 102, wherein a second portion 101R3 of the body 101 is disposed in the second recess 102R3, as shown in FIG. 1C.

In one embodiment, as shown in FIG. 1B, a third recess 101R1 is formed on the first lateral surface 102L1 of the substrate 102, wherein a portion of the connector 104 is disposed in the third recess 101R1.

In one embodiment, the substrate 102 is a PCB (Printed Circuit Board).

Figure 1D:
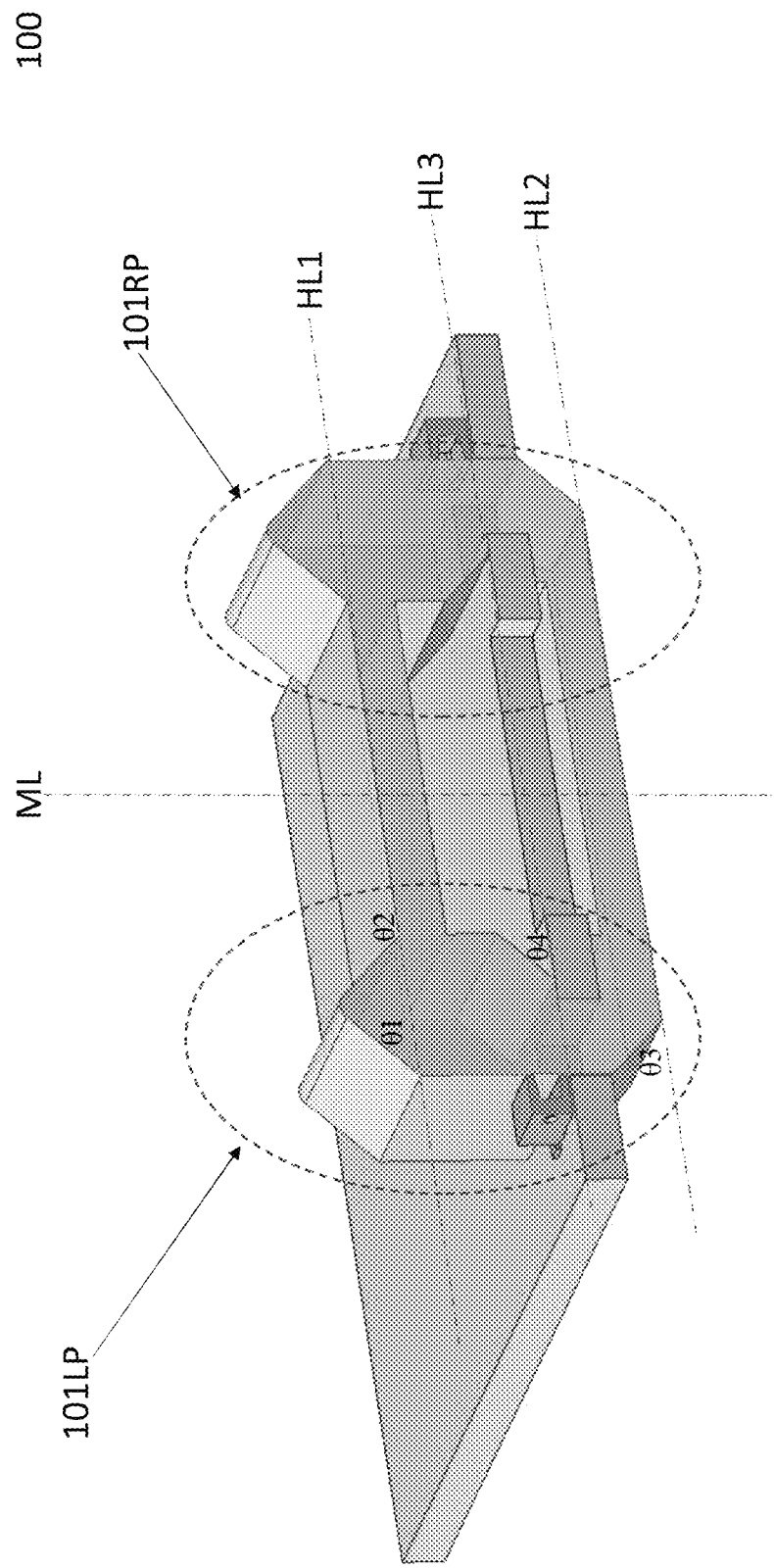
FIG. 1D depicts a perspective view of a light guide assembly according to one embodiment of the present invention.

In one embodiment, as shown in FIG. 1D, a left portion 101LP of the body 101 and a right portion 101RP of the body 101 are symmetrical with respect to a middle line ML between the left portion 101LP and the right portion 101RP of the body 101.

In one embodiment, as shown in FIG. 1D, the first slanting surface 101$a$ and horizontal line HL1 forms an angle $\theta 1$; the second slanting surface 101$b$ and the horizontal line HL1 forms an angle $\theta 2$; the third slanting surface 101$c$ and horizontal line HL2 forms an angle $\theta 3$; the fourth slanting surface 101$d$ and a horizontal line HL3 forms an angle $\theta 4$, wherein the angle $\theta 1$ is in a range of 20°~40°, the angle $\theta 2$ is in a range of 110°~130°; the angle $\theta 3$ is in a range of 35°~65°, and the angle $\theta 4$ is in a range of 40°~50°.

FIG. 2A depicts a perspective view of a light guide assembly 100 according to one embodiment of the present invention; and FIG. 2B depicts a perspective view of a light guide assembly 100 according to one embodiment of the present invention. Please refer to FIG. 2A and FIG. 2B together. In one embodiment, as shown in FIG. 2A, the top surface 101T of the body 101, the first protrusion 101$p1$, and the second protrusion 101p2 are located above the top surface 102T of the substrate 102.

In one embodiment, as shown in FIG. 2B, the bottom surface 101B of the body 101 is located under the bottom surface 102B of the substrate 102.

FIG. 3A depicts a perspective view of a light guide according to one embodiment of the present invention. In one embodiment, as shown in FIG. 3A, the top surface 101p1T of the first protrusion 101p1 comprises a flat surface between the first slanting surface 101a and the second slanting surface 101b.

FIG. 3B depicts a perspective view of a light guide according to one embodiment of the present invention. In one embodiment, as shown in FIG. 3B, the top surface 101T of the body 101 comprises a first portion 101TS having a plurality of protrusions, wherein said first portion 101TS is located between the first protrusion 101p1 and the second protrusion 101p2, and a first height of said first portion H3 is less than a second height of the first protrusion H1 and a third height H2 of the second protrusion 101p2, respectively.

In one embodiment, each protrusion of the first portion 101TS has a triangle shape.

In one embodiment, the first portion 101TS has a shape of a sawtooth swing up and down.

Figure 3C:
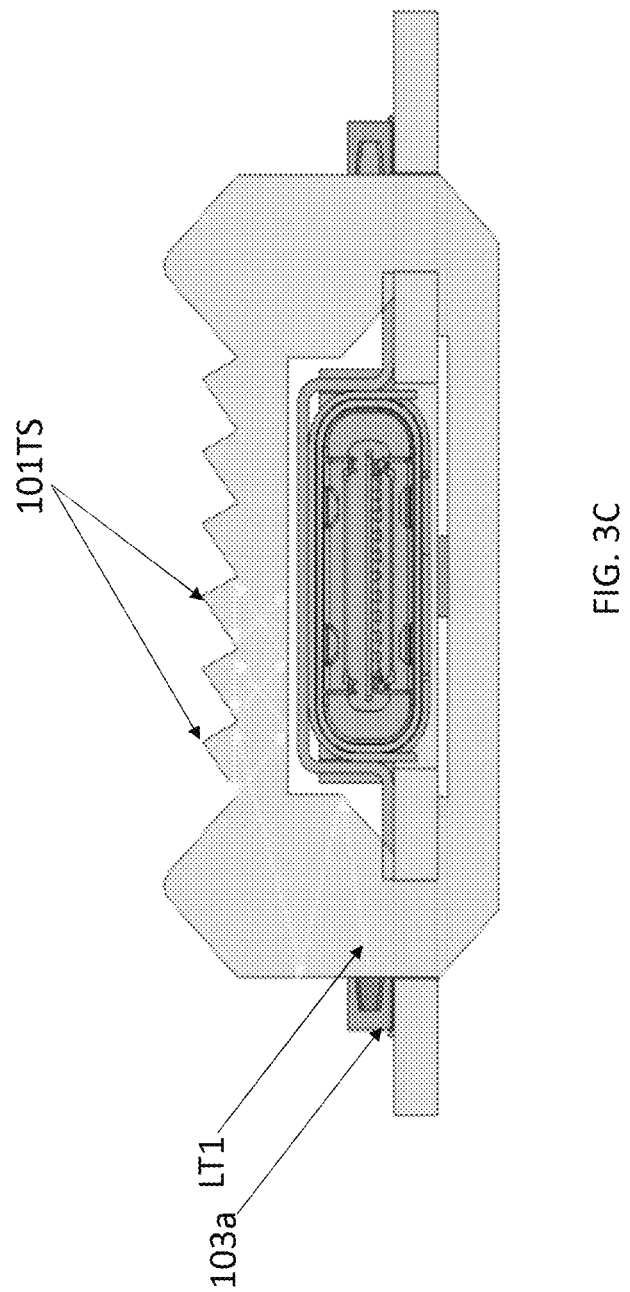
FIG. 3C shows a light path of the first light entering into the body of the light guide.

In one embodiment, FIG. 3C shows a light path of the first light LT1 emitted by the first LED 103a, wherein the first light LT1 can be reflected by each triangle shape of the first portion 101TS.

Figure 4:
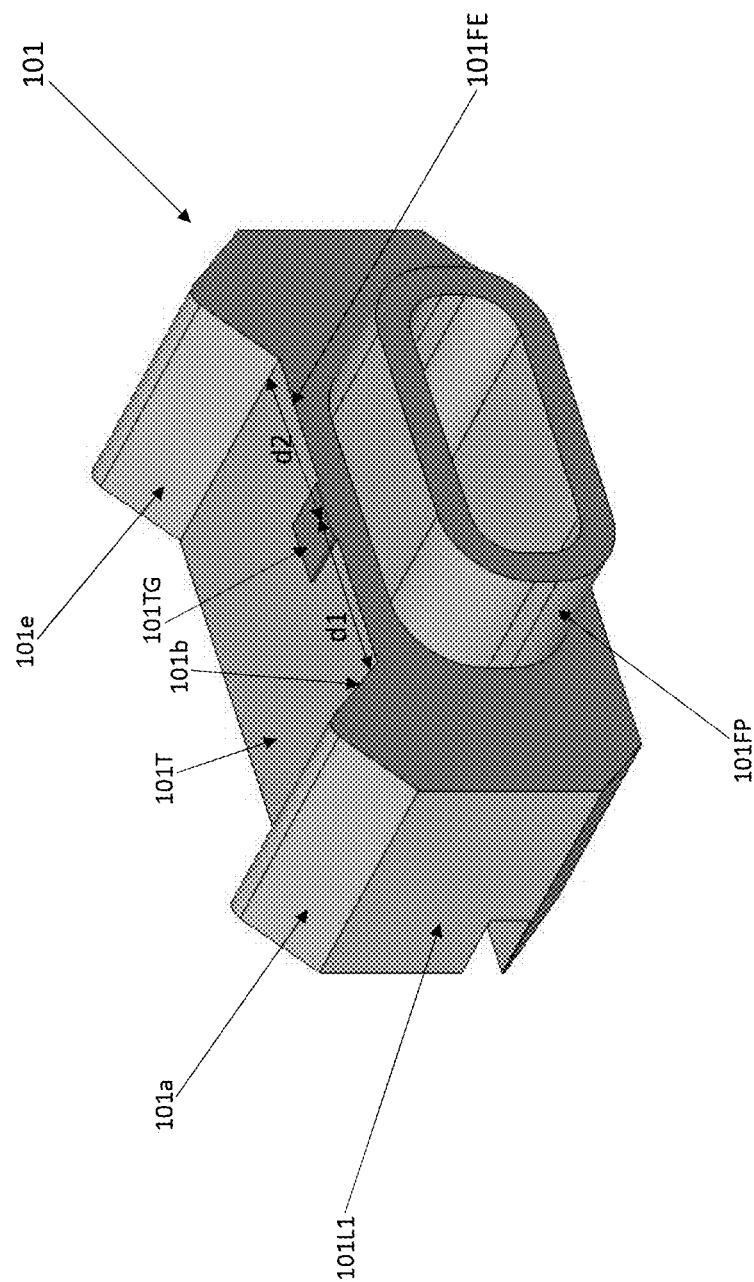
FIG. 4 depicts a perspective view of an intensity distribution of the front surface of the light guide.

FIG. 4 depicts a perspective view of a light guide according to one embodiment of the present invention. In one embodiment, as shown in FIG. 4, a tooling gate 101TG is formed on the top portion of the body of the light guide, wherein a first point is enclosed by the tooling gate 101TG, wherein a first distance d1 from the first point to the second slanting surface 101b is the same as a second distance d2 from the first point to the third slanting surface 101e. The position of the tooling gate as described above will improve the tolerance relative to the LED position for injecting lights into the body 101 of the light guide.

In one embodiment, as shown in FIG. 4, a boundary of the tooling gate 101TG is aligned with the front edge 101FE of the top surface 101T of the body 101 of the light guide.

Figure 5:
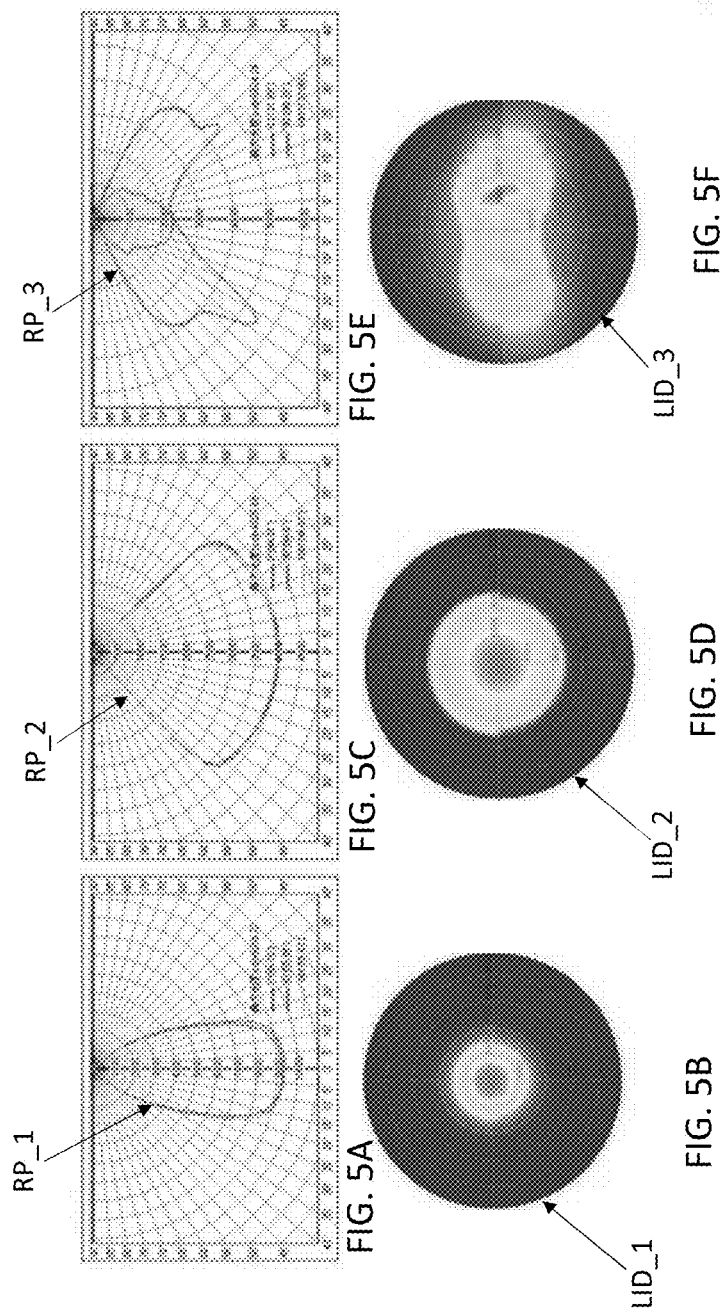
FIG. 5A shows a picture to illustrate a radiation pattern of lights generated by an LED.
FIG. 5B shows a picture to illustrate the intensity distribution of lights generated by an LED.
FIG. 5C shows a picture to illustrate a radiation pattern of lights generated by an LED.
FIG. 5D shows a picture to illustrate the intensity distribution of lights generated by an LED.
FIG. 5E shows a picture to illustrate a radiation pattern of lights generated by an LED.
FIG. 5F shows a picture to illustrate the intensity distribution of lights generated by an LED.

FIG. 5A shows a first radiation pattern RP_1 of the LED with a first radiation angle of 65° and a corresponding light intensity distribution LID_1 of the first radiation pattern RP_1 of the LED, as shown in FIG. 5B.

FIG. 5C shows a second radiation pattern RP_2 of the LED with a first radiation angle of 95° and a corresponding light intensity distribution LID_2 of the second radiation pattern RP_1 of the LED, as shown in FIG. 5D.

FIG. 5E shows a third radiation pattern RP_3 of the LED with a first radiation angle of 130° and a corresponding light intensity distribution LID_3 of the third radiation pattern RP_3 of the LED, as shown in FIG. 5F.

In a preferred embodiment, the radiation angle of the first vertical LED is in a range of 90°~100°.

In a preferred embodiment, the radiation angle of the first vertical LED is in a range of 95°.

Figure 6:
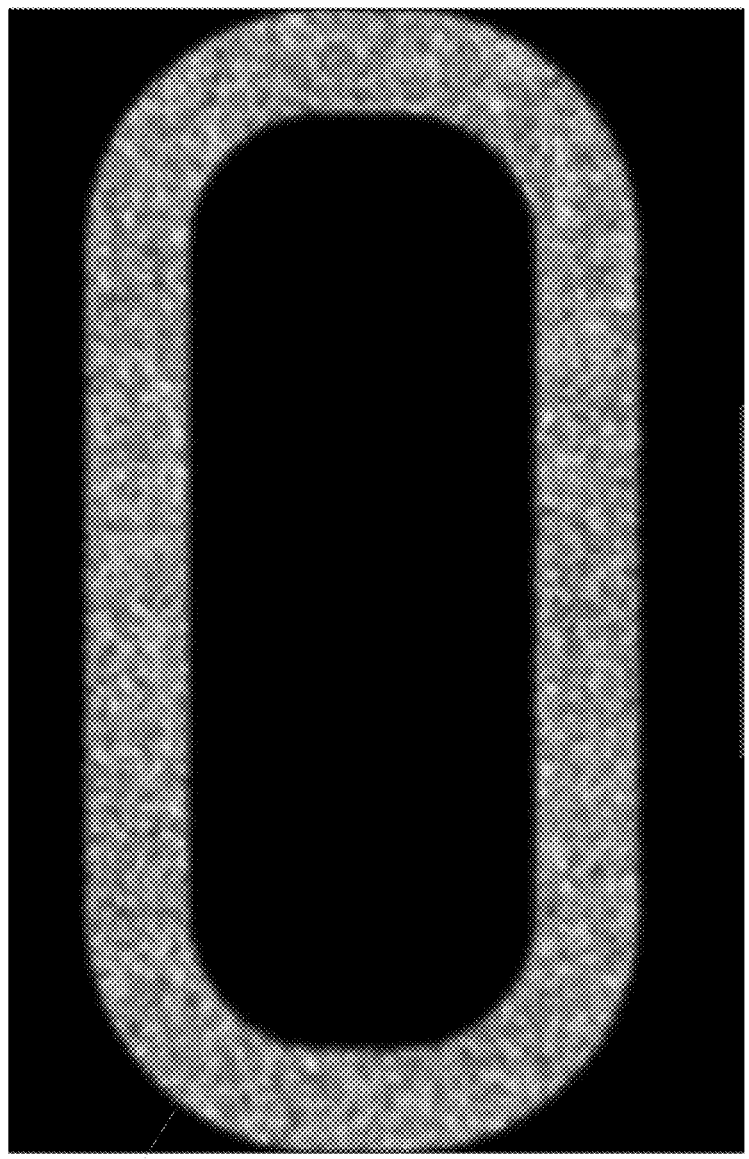
FIG. 6 depicts a perspective view of an intensity distribution of the front surface of the light guide.

FIG. 6 depicts a perspective view of an intensity distribution of the front surface of the light guide. according to one embodiment of the present invention.

In one embodiment, as shown in FIG. 6, an intensity distribution of all of the points of the front surface of the front portion of the light guide in a range of $(1.2~1.4) \times 10^6$ Lux, thereby the plug-in hole of the connector 104, such as a USB Type C connector, can be easily seen in a dark environment.

Figure 7:
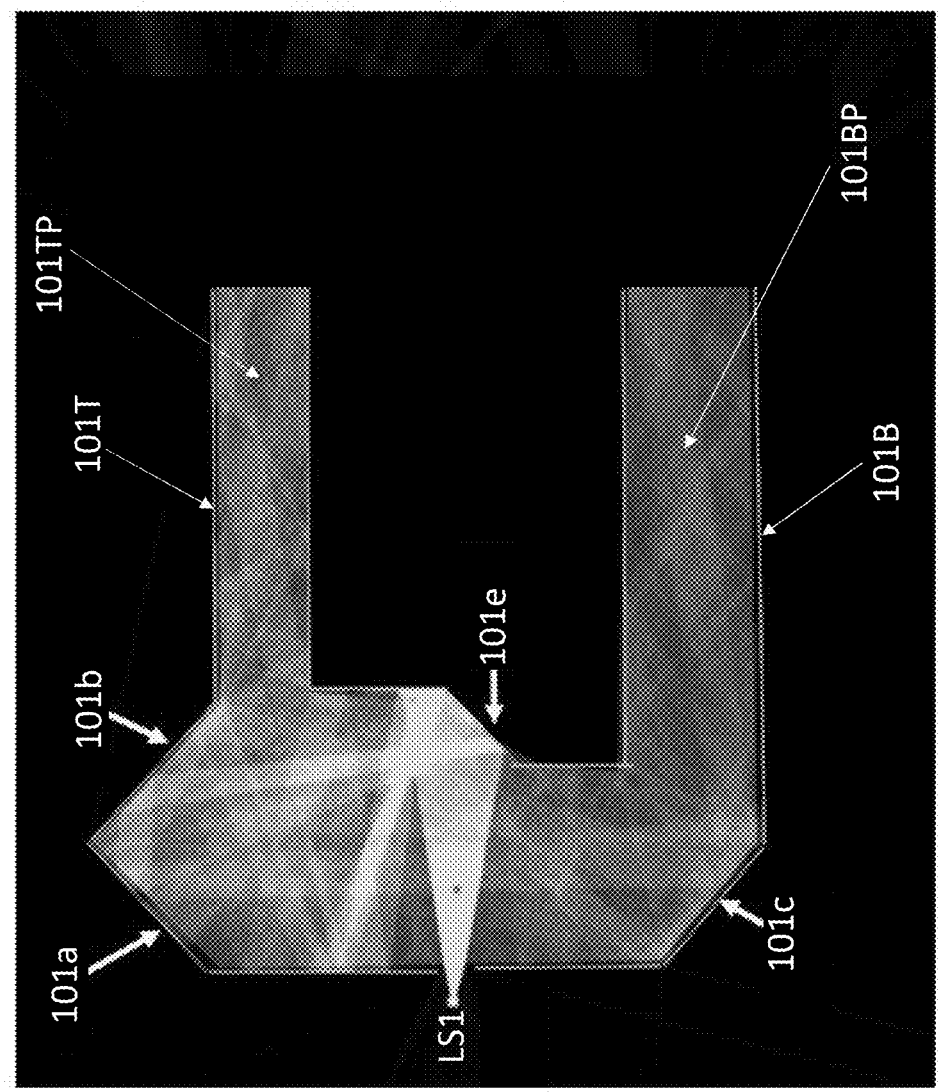
FIG. 7 shows a picture to illustrate the intensity distribution of lights inside the body of the light guide.

In one embodiment, FIG. 7 shows a picture to illustrate the intensity distribution of lights inside the body 101 of the light guide when a light source LS1 emits lights into the body, wherein the light intensity distribution in the top portion 101TP and the bottom portion 101BP of the body 101 can be in a uniform fashion by suing the reflecting surfaces such as 101e, 101a, 101b, 101c.

Although the present invention has been described with reference to the above embodiments, it will be apparent to one of ordinary skill in the art that modifications to the described embodiment may be made without departing from the spirit of the invention. Accordingly, the scope of the invention will be defined by the attached claims, not by the above-detailed descriptions.

What is claimed is:

1. A light guide assembly, comprising:
   a substrate; and
   a light guide, disposed on the substrate, wherein the light guide comprises a body having a top surface, a first lateral surface, and a second lateral surface opposite to the first lateral surface of the body, wherein the top surface of the body comprises a first protrusion having a first slanting surface and a second slanting surface opposite to the first slanting surface for reflecting lights entering into the body, wherein a first outer surface of the body extends from the first lateral surface to the first slanting surface, wherein a highest point of the first slanting surface is located between the first lateral surface and the second lateral surface, and a highest point of the second slanting surface is located between the first lateral surface and a lowest point of the second slanting surface.

2. The light guide assembly according to claim 1, wherein the top surface of the body further comprises a second protrusion having a third slanting surface and a fourth slanting surface opposite to the third slanting surface for reflecting lights entering into the body, wherein a second outer surface of the body extends from the second lateral surface to the fourth slanting surface, wherein a highest point of the fourth slanting surface is located between the first lateral surface and the second lateral surface, and a highest point of the third slanting surface is located between the second lateral surface and a lowest point of the third slanting surface.

3. The light guide assembly according to claim 2, wherein the body of the light guide comprises a top portion located above the substrate and a bottom portion located below the substrate, wherein the light guide forms a hollow space located below the top portion and above the bottom portion of the light guide, wherein a third outer surface of the body extends from the first lateral surface to the bottom surface of the body via a fifth slanting surface of the body, wherein a lowest point of the fifth slanting surface is located between the first lateral surface and the second lateral surface, wherein the body comprises a sixth slanting surface adjacent to the hollow space, wherein a lowest point of the sixth slanting surface is located between the first lateral surface and a highest point of the sixth slanting surface, wherein a first light enters into the body through the first lateral surface, wherein the first light is directed to the bottom part of the light guide by sequentially reflecting the first light by the sixth slanting surface, the second slanting surface, the first slanting surface and the fifth slanting surface.

4. The light guide assembly according to claim 3, wherein a first LED is disposed on the substrate outside the body, wherein the first LED is located at a lateral side of the first lateral surface for emitting the first light into the body via the first lateral surface.

5. The light guide assembly according to claim 4, wherein the first LED is a first vertical LED, wherein the first vertical LED emits the first light to the first lateral surface in a horizontal direction.

6. The light guide assembly according to claim 3, wherein a fourth outer surface of the body extends from the second lateral surface to the bottom surface of the body via a seventh slanting surface, wherein a lowest point of the seventh slanting surface is located between the first lateral surface and the second lateral surface, wherein the body comprises an eighth slanting surface adjacent to the hollow space, wherein a lowest point of the eighth slanting surface is located between the second lateral surface and a highest point of the eighth slanting surface, wherein a second light enters into the body through the second lateral surface, wherein the second light is directed to the bottom part of the light guide by sequentially reflecting the second light by the eighth slanting surface, the third slanting surface, the fourth slanting surface and the seventh slanting surface.

7. The light guide assembly according to claim 6, wherein a first LED is disposed on the substrate outside the body, wherein the first LED is located at a lateral side of the first lateral surface for emitting a first light into the body via the first lateral surface; and wherein a second LED is disposed on the substrate outside the body, wherein the second LED is located at a lateral side of the second lateral surface for emitting a second light into the body via the second lateral surface.

8. The light guide assembly according to claim 7, wherein the first LED is a first vertical LED, wherein the first vertical LED emits the first light to the first lateral surface in a horizontal direction; and the second LED is a second vertical LED, wherein the second vertical LED emits the second light to the second lateral surface in a horizontal direction.

9. The light guide assembly according to claim 8, wherein the body comprises a front portion having a ring shape, wherein a connector is disposed inside a hollow space of the body with a portion of the connector being enclosed by the front portion.

10. The light guide assembly according to claim 1, wherein the top surface of the body comprises a first portion having a shape of a sawtooth swing up and down, wherein said first portion is located between the first protrusion and the second protrusion, and a first height of said first portion is less than a second height of the first protrusion and a third height of the second protrusion, respectively.

11. The light guide assembly according to claim 9, wherein the connector is a USB Type C connector.

12. The light guide assembly according to claim 9, wherein an intensity distribution of all of the points of the entire front surface of the front portion in a range of $(1.2\sim1.4)\times10^6$ Lux.

13. The light guide assembly according to claim 1, wherein the body of the light guide comprises a transparent resin, wherein a diffusion powder is disposed in the transparent resin.

14. The light guide assembly according to claim 1, wherein a tooling gate is formed on the top portion of the body of the light guide, wherein a first point is located inside the boundary of the tooling gate, wherein a first distance from the first point to the second slanting surface is equal to a second distance from the first point to the third slanting surface.

15. The light guide assembly according to claim 1, wherein a left portion of the body and a right portion of the body are symmetrical with respect to a middle line between the left portion and the right portion of the body.

16. The light guide assembly according to claim 5, wherein the radiation angle of the first vertical LED is in a range of 90~100°.

17. The light guide assembly according to claim 1, wherein the top surface of the first protrusion comprises a flat surface between the first slanting surface and the second slanting surface.

18. The light guide assembly according to claim 1, wherein a first recess is formed on a first lateral surface of the substrate, wherein a first portion of the body is disposed in the first recess.

19. The light guide assembly according to claim 18, wherein a second recess is formed on the first lateral surface of the substrate, wherein a second portion of the body is disposed in the second recess.

20. The light guide assembly according to claim 19, wherein a third recess is formed on the first lateral surface of the substrate, wherein a portion of a connector is disposed in the third recess.

* * * * *